United States Patent [19]
Law et al.

[11] 3,784,125
[45] Jan. 8, 1974

[54] FISHING APPARATUS

[76] Inventors: Richard D. Law, 10867 W. 30th Ave., Lakewood, Colo. 80215; Robert E. Eckels, 2101 Youngfield St., Golden, Colo. 80401

[22] Filed: July 22, 1971

[21] Appl. No.: 165,231

[52] U.S. Cl................. 242/96, 43/21, 242/84.1 A, 242/84.2 J
[51] Int. Cl............................................. A89k 89/00
[58] Field of Search............ 242/85.2 J, 96, 84.1 A, 242/84.1 R, 84.2 R, 84.2 H, 84.2 F, 85.1; 43/21

[56] References Cited
UNITED STATES PATENTS

| | | | |
|---|---|---|---|
| 2,896,875 | 7/1959 | Reed et al................ | 242/84.1 A |
| 2,706,096 | 4/1955 | Rufle........................ | 242/84.2 J |
| 3,174,703 | 3/1965 | Falkum..................... | 242/84.2 J X |
| 2,615,649 | 10/1952 | Flewelling................ | 242/84.2 J |
| 2,896,354 | 7/1959 | Reed et al................ | 242/84.3 X |
| 2,749,058 | 6/1956 | Hill........................... | 242/84.2 H |
| 2,855,717 | 10/1958 | Heil.......................... | 242/96 X |
| 2,586,170 | 2/1952 | Lawrenz................... | 242/96 X |

*Primary Examiner*—Billy S. Taylor

[57] ABSTRACT

Fishing apparatus having a tubular disc-shaped member mounted on a handle and a rotatable open face spool for fishing line, drag for the spool being mechanically adjustable. Line feed and drag is further controllable by manipulation of the handle relative to the line direction.

2 Claims, 3 Drawing Figures

PATENTED JAN 8 1974　　　　　　　　　　3,784,125
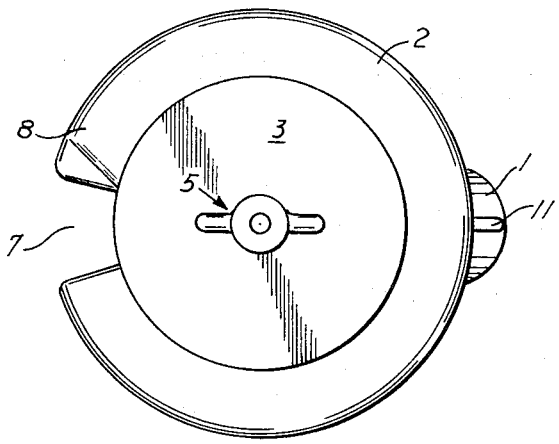
FIG. 2
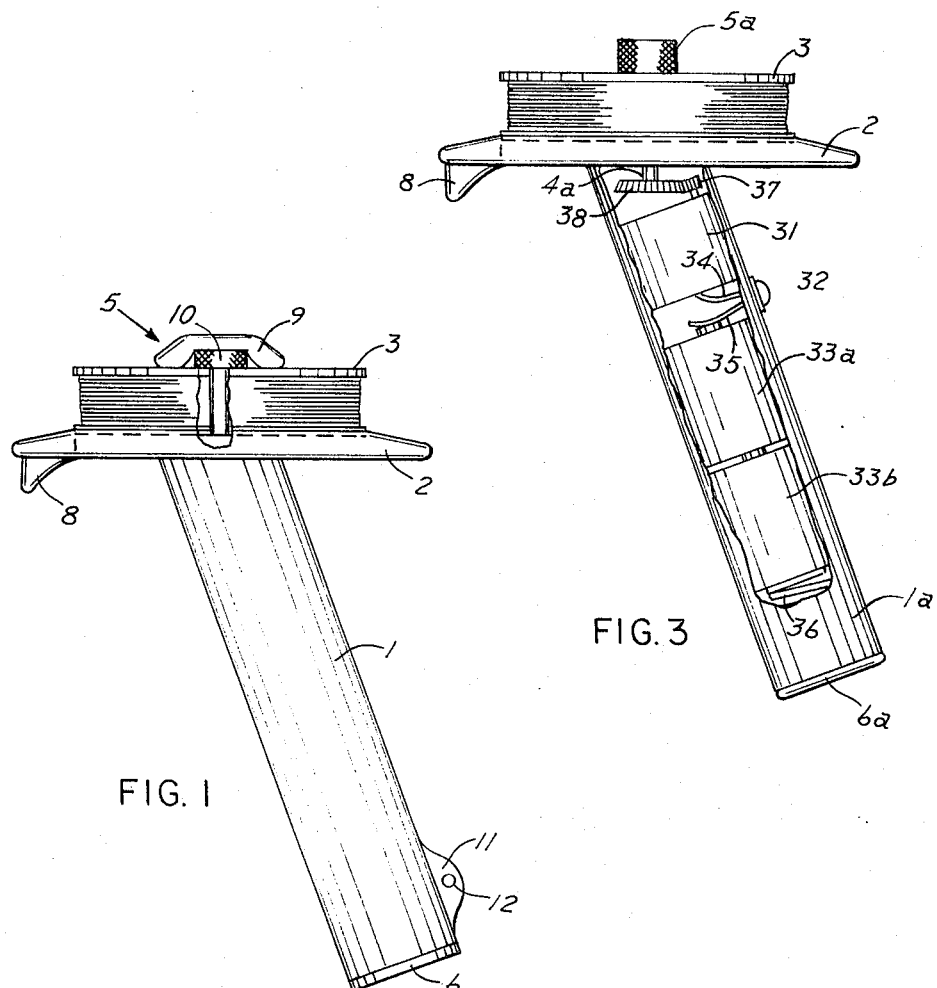
FIG. 3
FIG. 1
INVENTORS
RICHARD D. LAW
ROBERT E. ECKLES
BY *Richard H. Law*
ATTORNEY

FISHING APPARATUS

The present invention relates to simplified apparatus for fishing. In general, the invention provides a short handle member having an open face, fishing line spool mounted thereon. A user of the apparatus of the invention holds the device in one hand with an end portion of the fishing line having a lure dangling from the spool. The lure may be tossed in an underarm throw or in the manner of a sling shot, e.g. twirling the lure over one's head then releasing it. Outward travel of the line and lure may be controlled by manipulation of the handle or by finger pressure on the line which peels off the reel. While a conventional casting outfit includes a long rod and a complex reel, the present invention eliminates the rod and provides a simplified, complete fishing unit which fits in a hand. With practice, the apparatus of the invention may be utilized to cast with surprising distance and accuracy, and may be utilized to play and reel in a fish with ease and control.

It is, accordingly, an object and advantage of the present invention to provide simplified apparatus for fishing.

Another object and advantage of the present invention is to provide conveniently carried and durable fishing apparatus for casting and reeling.

Yet another object of the invention is to provide a small complete fishing apparatus which may be carried in a pocket and is quickly and easily rigged for fishing.

These and other objects and advantages of the present invention may be readily ascertained by referring to the following description and appended illustrations in which:

FIG. 1 is a top plan view of the apparatus of the invention;

FIG. 2 is a side elevational view of the apparatus of the invention; and

FIG. 3 is a detail, partially schematic, of a further embodiment of the invention.

Considering FIGS. 1 and 2, tubular, hollow handle member 1 has disc-shaped member 2 mounted at one end thereof which supports rotating spool 3 on shaft 4. The spool is secured by nut assembly 5 on shaft 4. The handle may be centrally located on the disc or it may be slightly off-set toward the top for ease of placing a finger or thumb in slot 7 in the disc. Spool 3 may be a conventional fishing line spool having a hub and two radial flanges, commercially available, and typically utilized for monofilament line. The spool should have its inside flange recessed in the disc-shaped member. Although handle 1 may have numerous configurations, such as a finger grip shape, the illustrated embodiment with a roughened grip is particularly satisfactory. As shown, handle 1 is a hollow plastic tube with selectively removable end cap 6 so that lures, hooks, etc., may be stored in the handle. The surface of the handle may be roughened, have ridges, and so on, to make gripping easier particularly with wet hands.

Disc member 2, which may, also, be plastic, may be integral, heat sealed, cemented, or otherwise fixed at an angle to the axis of handle 1. The angle is preferably about 70°, but may be in the range of 30° – 90°. Along the periphery of disc 2 is formed slot 7 radially extending inwardly to about the rim of spool 3. Preferably, slot 7 is formed in disc 2 at about the apex of the outside angle of handle 1 with disc 2 (FIG. 1). Assuming a right hand to be gripping handle 1, the right thumb or forefinger will easily rest upon spool 3. A flange 8 at peripheral slot 7 directed towards handle 1 may be provided to further effect a comfortable thumb or finger rest, as well as to assist guiding the line to the spool in retrieving and winding. For a left handed configuration, this flange 8 will be located on the opposite side of the slot.

Spool 3 is rotatably mounted to disc member 2. One manner in which to effect such a mounting is to concentrically fix threaded shaft 4 to disc 2 and secure spool 3 thereon with threaded nuts 5. Nuts 5 may include reversed wing nut 9 and lock nut 10 in a double-nut arrangement to assure that spool 3 will not, by friction, be loosened. The torque with which nuts 5 are pulled down on spool 3 will determine the drag on the outgoing line when playing a fish. The reversed wing nut 9 prevents the line from wrapping around the nut assembly in the event of a slip when reeling-in. A wide variety of other arrangements may be utilized to secure spool 3 rotatably on disc 2, including spring washers and wing nuts, which will provide drag on spool 3. A typical fishing reel arrangement may be made, where one direction rotation (pulling the line out) is on drag while in the opposite direction no rotation is permitted.

Flange 11 with aperture 12 therethrough may be provided on the base of handle 1. A strap, chain or the like may be inserted through aperture 12 so that the apparatus may be selectively attached to other objects. The apparatus, thereby, might be suspended from a belt, attached to a boat seat cushion, etc.

With the embodiment of FIG. 1, reeling is accomplished by hand, but reeling may be made semi-automatic or automatic as shown in FIG. 3, as by an electric motor or a spring wound motor. Motor 31 is mounted in handle 1a and is actuated by button 32 to electric power supply batteries 33a and 33b, also in handle 1a. Handle 1a may be a plastic hollow tubular handle generally similar to handle 1 of FIG. 1. Miniature, direct-current electric motors are well known and commercially available; it is suggested that motor 31 be a relatively slow speed, high torque motor. Insulated wire lead 34 to actuation button 32, spring contact 35 to battery 33a, and button 32 are conventional methods of electrical connection, and other connection arrangements may be used. Likewise, batteries 33a and 33b are well known commercially available dry cell batteries connected in parallel. The spring wound motor, of course, takes the place of the electric motor and winding means extended to the end of the handle.

Spring 36, maintained in position by handle end cap 6a, may be utilized to exert mechanical pressures on the batteries 33a and 33b to maintain electrical contact. Gear 37 mounted on a shaft from motor 31 engaging gear 38 on shaft 4a keyed to spool 3 may be utilized to revolve spool 3. It is suggested that gears 37 and 38 be self-lubricating, non-rusting gears. The configuration of the gears and the manner of effecting mechanical power transmission from motor 31 to spool 3 depends upon the characteristics of motor 31. Shaft 4a may be keyed, a square shaft, or otherwise arranged to rotate reel 3 therewith. Nut means 5a may be one of a variety of fasteners arranged on shaft 4a to maintain spool 3 on shaft 4a and to cause drag between spool 3 and disc 2. Also, the batteries may be carried separately and connected by leads to the switch for the motor.

One manner of operation of the apparatus is to hold handle 1 in the left hand with the thumb on that hand resting through slot 7 onto fishing line on spool 3. About a foot or so of line and lure is held in the right hand and, with a whip-like underarm motion, the line and lure may cast out into a lake or stream. The longitudinal axis of the handle 1 should, at the time of casting, be generally aligned with the direction of cast. The distance of the cast may be controlled by the pressure of the thumb of the left hand on the line coming off spool 3. The cast may be abruptly terminated, for example, by turning handle 1 so that its longitudinal axis is generally perpendicular to the direction of the cast. In a like manner, handle 1 may be turned to vary the line tension when playing a fish. When handle 1 is perpendicular to the direction of the line, the line can feed out only by rotating spool 3, and the rotation of spool 3 is regulated by the drag of spool 3 against disc 2 and may be adjusted by nuts 5. Reeling in of the line may be accomplished by holding handle 1 perpendicular to the direction of the line and either using the right hand to loop line onto spool 3 or using electric motor 31 (FIG. 2) actuated by button 32 to rotate spool 3 while guiding the line with the right hand. Crank or other arrangements may be utilized alternatively to motor 31 to rotate spool 3. The crank or reel handle, through gearing, shafts and the like, may be extended through the side of the handle or out the end of the handle.

The unit may be made of plastic and quite light, so that it is excellent for back-packers or like. Also, it is highly effective for storing in the glove compartment of an automobile for a quick cast or two into a likely looking stream or lake. When made of plastic and having a hollow handle, the unit will be floatable.

We claim:
1. Fishing apparatus comprising:
   a. an elongated handle member arranged to be grasped by a hand,
   b. a generally disc-shaped member fixed on an end of said handle member and at an angle of about 70° to the axis of said handle, said disc-shaped member having a radius greater than the radius of the flanges of a spool of fishing line to be mounted thereon;
   c. shaft means for mounting a spool of fishing line on said disc-shaped member; and
   d. said disc-shaped member having a slot formed in the periphery thereof at a position cooperative with said handle member for thumb-controlling line fed from the spool while hand-holding the handle member.

2. Apparatus according to claim 1 including a flange portion extending from said disc-shaped member towards said handle, said flange defining one side of said slot, providing a line guide and a thumb-resting surface.

* * * * *